Dec. 25, 1956    P. R. BELL ET AL    2,775,698
MULTICHANNEL PULSE ANALYZER
Filed April 10, 1953    4 Sheets-Sheet 1
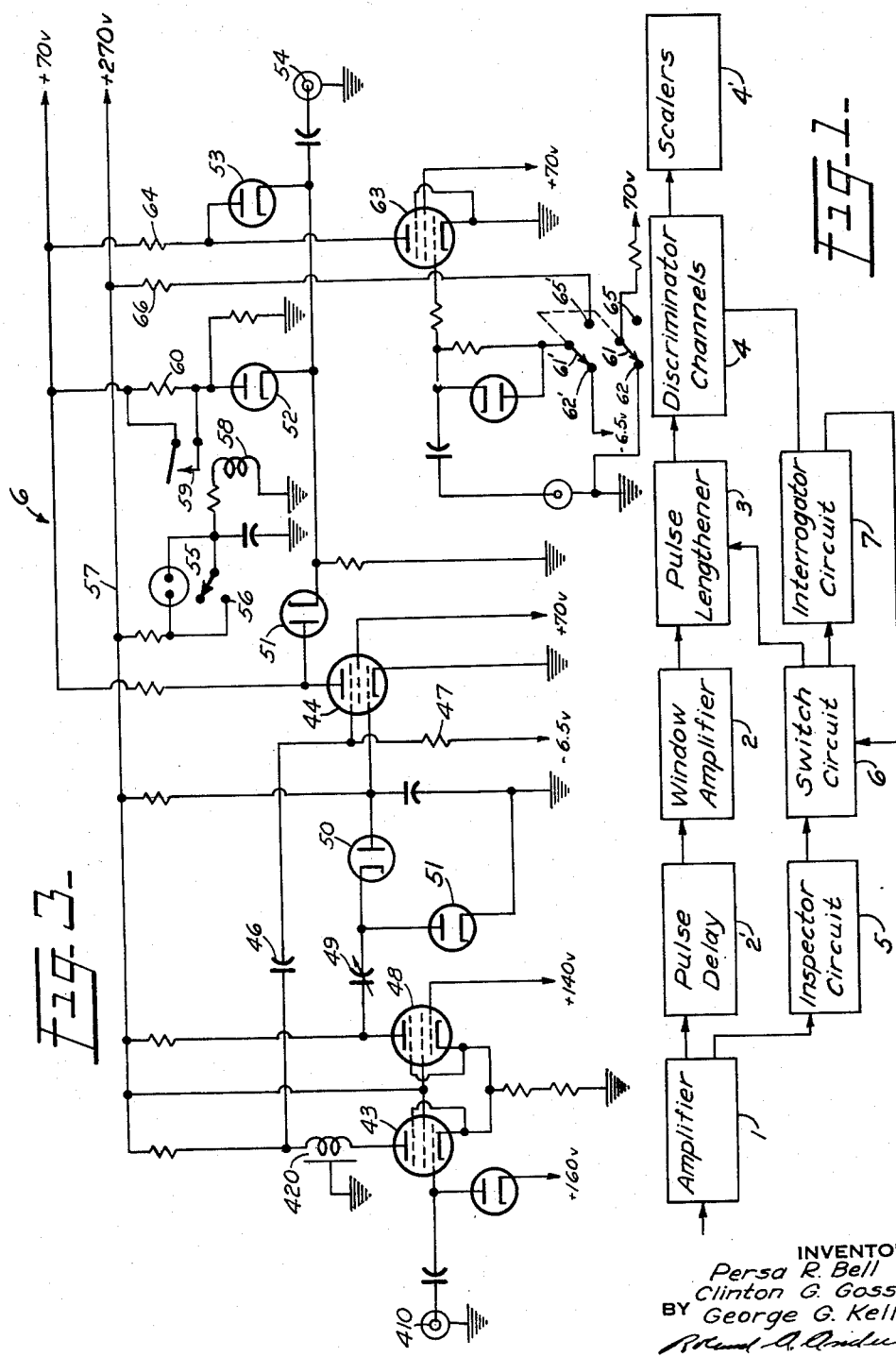
INVENTORS
Persa R. Bell
Clinton G. Goss
BY George G. Kelley
ATTORNEY INVENTORS
Persa R. Bell
Clinton G. Goss
George G. Kelley
BY
ATTORNEY Dec. 25, 1956    P. R. BELL ET AL    2,775,698
MULTICHANNEL PULSE ANALYZER
Filed April 10, 1953    4 Sheets-Sheet 3

Fig. 4.

INVENTORS
Persa R. Bell
Clinton G. Goss
BY George G. Kelley
Roland A. Anderson
ATTORNEY Dec. 25, 1956 P. R. BELL ET AL 2,775,698
MULTICHANNEL PULSE ANALYZER
Filed April 10, 1953 4 Sheets-Sheet 4

INVENTORS
Persa R. Bell
Clinton G. Goss
BY George G. Kelley
Roland A. Anderson
ATTORNEY

United States Patent Office 2,775,698
Patented Dec. 25, 1956

2,775,698

MULTICHANNEL PULSE ANALYZER

Persa R. Bell and George G. Kelley, Oak Ridge, Tenn., and Clinton G. Goss, Glenview, Ill., assignors to the United States of America as represented by the United States Atomic Energy Commission Application April 10, 1953, Serial No. 347,906

7 Claims. (Cl. 250—27)

The present invention relates to pulse amplitude analyzers, and more especially to an improved multi-channel pulse amplitude analyzer for sorting electrical impulses into groups according to their respective amplitudes.

In the utilization and detection of radioactivity, electrical signals may be produced which have amplitudes proportional to the quantity being investigated. A great many individual events, occurring randomly in time, may be produced by a detector of radioactivity, and useful information may be derived from the train of signals by determining the number of pulses having amplitudes falling within certain limits.

With the pulse analyzers of the prior art, research has been impeded by the limitations on integral counting rate occasioned by the circuit design, counting rates of about 5,000 counts per second being the maximum which can be resolved. Analyzers will continue to operate at higher counting rates, but the spectrum may be distorted and inaccurate. The primary cause of such distortion is the gated amplifier utilized in most analyzer inputs, which must be turned off during the time each pulse is being analyzed, then gated back on after a predetermined time interval. Should another pulse arrive while the amplifier is being gated on, part of the incoming pulse will be lost and the amplitude will be correspondingly low, or should the tail of preceding pulse still be present at that time, the received pulse will be added to the tail of the preceding pulse and the amplitude recorded will be correspondingly too high. Therefore, for accuracy, the counting rate must be kept low enough so that each pulse analysis is completed before the arrival of the following pulse. Another source of errors in multi-channel analyzers of the prior art has been the recording of one pulse in two adjacent discriminator channels if its amplitude is near the maximum amplitude of one channel and the minimum amplitude for the adjacent channel, due to the finite time required to reset the lower order channel after the next higher order channel has been triggered.

With the knowledge of the defects of multi-channel analyzers of the prior art, we have invented a novel pulse sorter that eliminates the conventional gated amplifier technique with its attendant limitations. According to the principles of our invention, when a pulse is received it is stored for a predetermined, very short time interval. If during this interval no other pulse arrives, the original pulse will be removed from storage and analyzed, but if another pulse does arrive, both pulses will be discarded. The entire process of analysis is completed in a very short time interval and the analyzer is again ready to receive the next pulse. We have also provided improved means for lengthening the stored pulses and for sorting them according to amplitude involving simultaneous interrogation of all of a group of discrete discriminator channels, and comparison of adjacent channels by anti-coincidence circuits. By virtue of this novel design, the discriminators themselves need not be particularly fast in operation. Moreover the circuit design is greatly simplified so that fewer vacuum tubes are required for a 20 channel analyzer constructed according to the principles of our invention than are required for a 10 channel analyzer constructed according to the teachings of the prior art.

Accordingly it is a primary object of the present invention to provide a multi-channel amplitude analyzer capable of receiving and analyzing electrical impulses accurately at very fast counting rates.

A further object of our invention is to provide a multichannel pulse analyzer having a different mode of operation from prior art devices and providing correspondingly faster and more accurate operation.

Another object of the present invention is to provide a faster, more reliable pulse amplitude analyzer utilizing novel electronic circuit design to provide a substantial saving in number of components required, in initial cost, in space requirements, and in maintenance requirements.

Other objects and advantages of our invention will be apparent from the following detailed description of a preferred embodiment thereof, when read in connection with the appended drawings, in which:

Figure 1 is a block diagram showing the major components of our improved pulse amplitude analyzer.

Figure 3 illustrates the novel inspector circuit shown in block form in Figure 1.

Figure 4 illustrates an electronic switching circuit and the associated interrogator circuit shown in Figure 1 in block form, with additional pulse shaping circuits.

Figure 5:
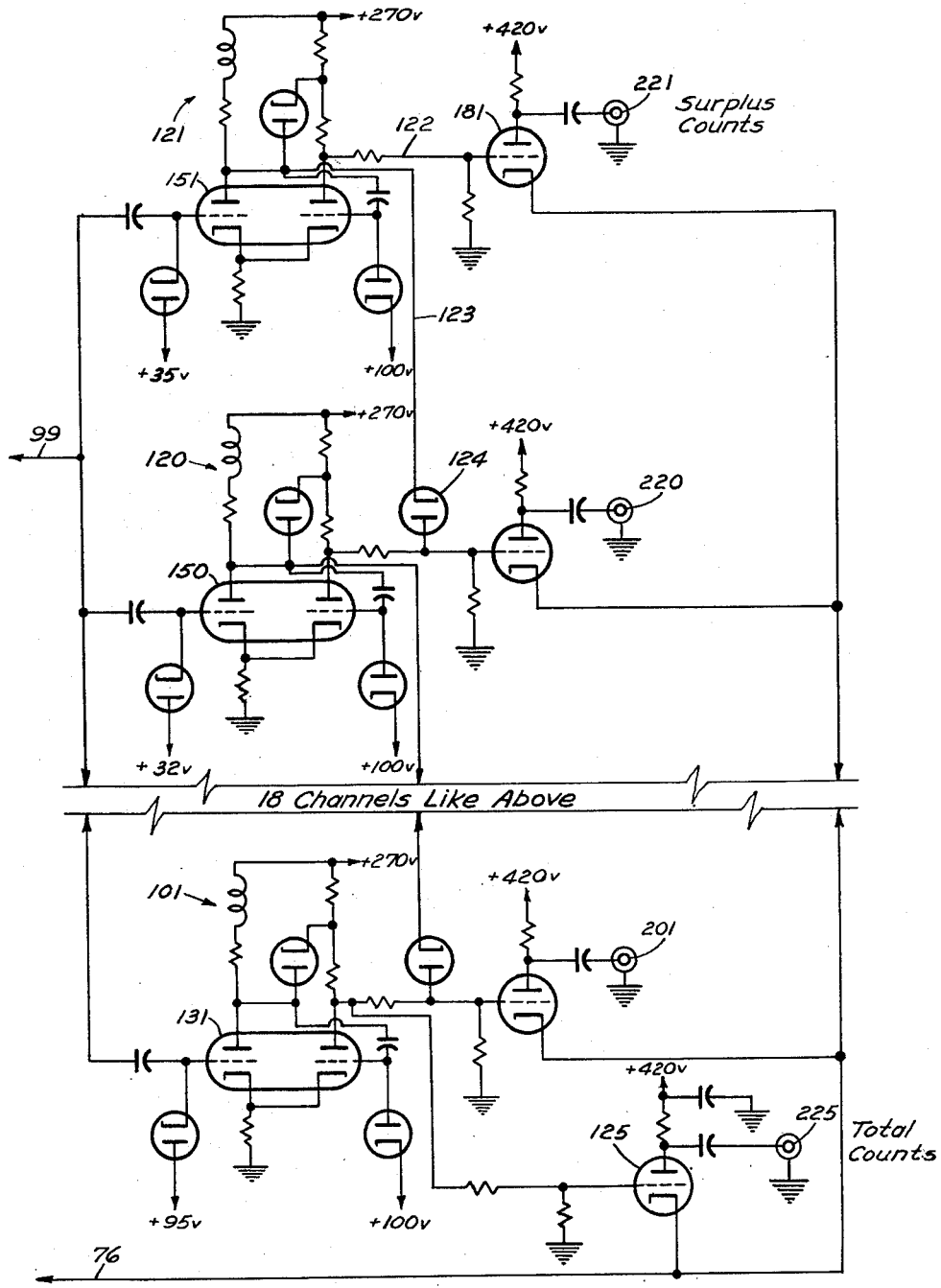
Figure 5 illustrates three of a plurality of identical channels of discriminator circuits for sorting the lengthened pulses according to amplitude.

Referring now to Figure 1, our analyzer system comprises a linear amplifier 1 adapted to receive input pulses and from which two pulses are derived; first, a signal pulse proportional to the amplitude of the received input pulse, and second, a control pulse of constant amplitude. The signal pulse is delayed by suitable means 2' such as a delay line for 2.4$\mu$ sec. When the pulse comes out of the delay line it is amplified by a conventional amplitude selective amplifier 2, lengthened in a pulse lengthener circuit 3, and then fed simultaneously to discriminator channels 4. The control pulse from amplifier 1 is fed to "inspector" circuit 5, which will produce an output signal delayed by a selected interval only if no pulse follows the control pulse by the selected time interval, which may preferably be 2.3$\mu$ sec. The "inspector" output pulse is delivered to a switching circuit 6 which will enable the lengthening circuit 3 to lengthen the signal pulse and will also activate the interrogator circuit 7. The latter circuit provides a first pulse for simultaneous inspection of all the 20 discriminator channels 4 and a second pulse for resetting the switch circuit 6 to the proper position for receiving the next control pulse. For each pulse received by the discriminators 4, one channel will deliver an output pulse to its associated pulse counter or scaler 4'.

The linear amplifier 1 may preferably be the A-1 linear amplifier, described in Review of Scientific Instruments 18, 703–706. The control pulse is derived from the pulse height selector section of the amplifier, which is modified to deliver a negative, rather than positive, pulse at the output marked J5 in the publication. The signal pulse output may be taken from terminal J4, as shown in the publication, and coupled to the input terminal 20 of amplitude selective amplifier 2 through relay line 9, which may comprise a length of RG 65/U cable cut to provide 2.4μ sec. delay. The amplifier may be substantially the same as the pulse-height-selecting feed back amplifier described in co-pending application S. N. 224,895, now U. S. Patent 2,642,527, and illustrated in Figure 3 of that application. It comprises cathode-follower 21 and a three-stage feedback amplifier including tubes 23, 24, and 25. Double diode 26 in the control grid circuit of tube 23 limits the rise of that control grid and prevents tube 23 from drawing excessive grid current. Gas tube 27 is a voltage regulator to provide suitable bias voltage for the control grids of twin triode 21.

Figure 2:
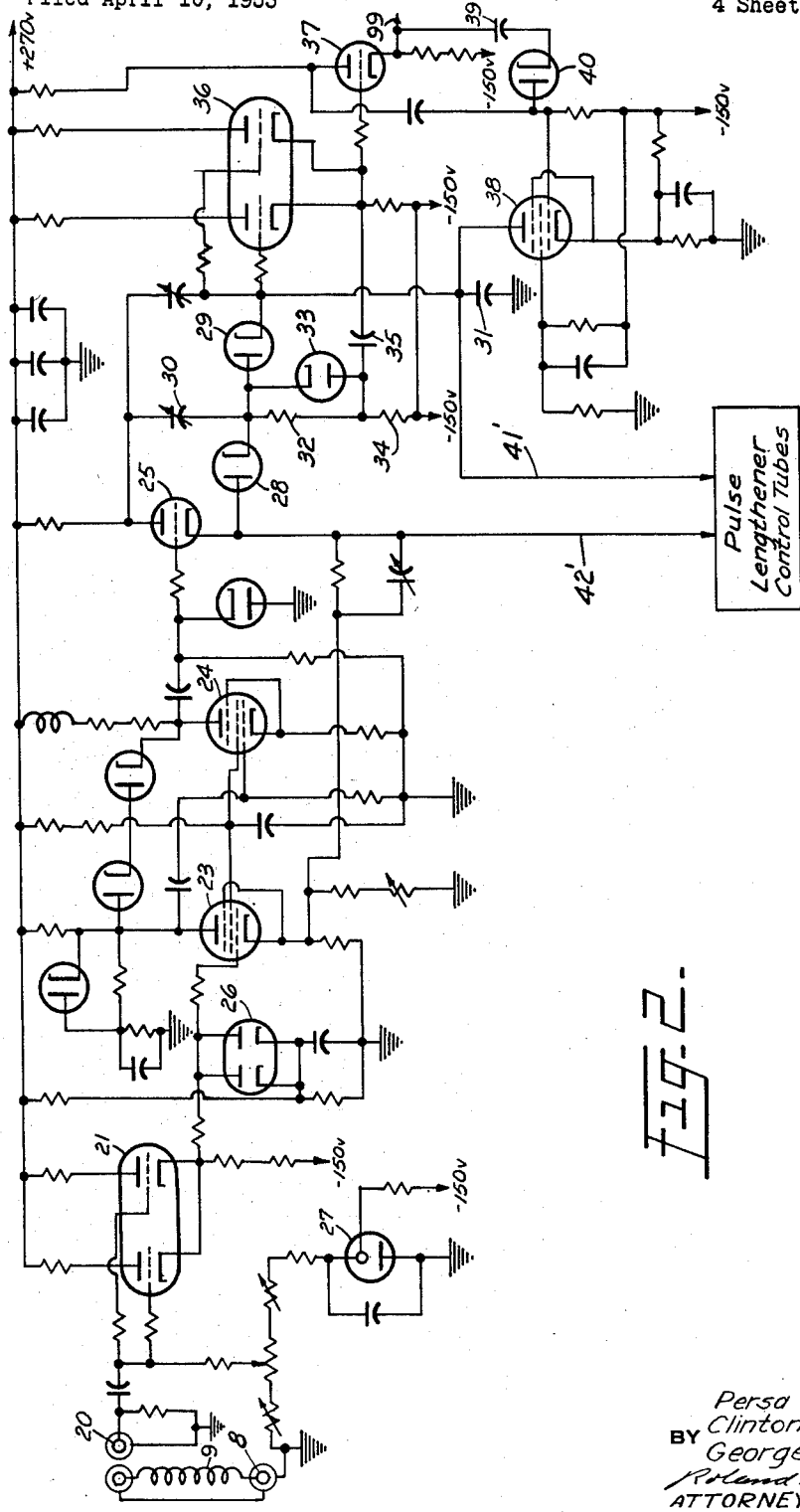
Figure 2 is a detailed circuit schematic diagram illustrating preferred embodiments of the amplitude selective amplifier and associated pulse lengthener of Figure 1.

Prior pulse lengthening circuits have not been entirely satisfactory, partly because of the inherent characteristics of the diodes employed therein. Vacuum diodes are relatively slow in responding to a steep wave front, but will maintain the pulse amplitude well, due to their large forward and back resistances. They have a large capacitive current, which is difficult to cancel by a pulse because a cancelling pulse must have identical wave shape with the incident pulse. Crystal diodes, because of their relatively low resistances, will respond rapidly to a steep wave front and thus transmit a pulse with a fast rise time better than vacuum diodes, but will not hold the pulse height at a constant value as well as the vacuum diodes. The improved pulse lengthener circuit shown in Figure 2 is designed to utilize the good characteristics of the crystals while overcoming the undesirable characteristics thereof. Normally current is caused to flow through both diodes 28 and 29, so that linear conditions will obtain in the circuit. Current is supplied to the diodes through tube 41, which is one of a pair of current tubes shown in Figure 4. Tube 41 is cut off by a signal from switch circuit 6 before the arrival of a pulse in lengthener 3. Tube 42 will then conduct so that the cathode current in the cathode follower 25 at the output of the amplifier 2 will remain constant, keeping the plate potential of that tube constant, so that the magnitude of the capacity cancelling pulse supplied through condenser 30 to the diodes will remain unchanged. Each pulse delivered by follower 25 to the diodes will charge condenser 31. The charging voltage will lag slightly behind the pulse from follower 25 because of the finite resistances of the diodes. Resistance 32, shunted by diode 33, and resistance 34 are coupled to a source of −150 volts, while condenser 35 is connected between the cathode of tube 36 and the junction of the resistors 32, 34. A potential difference of about .35 volt is thus established between the plate of diode 29 and the plate of diode 33, which potential is retained during the pulse lengthening process and is supplemented by any change in the grid to cathode potential of tube 36. When the tube 36 conducts, due to the increase of charge on condenser 31, the tube cathode potential will rise by an amount almost equal to the rise of the grid, by virtue of the cathode follower action, so that there will be only a small back-voltage across diode 29 even when the input pulse from tube 25 is removed. With this small applied back-voltage, the back resistance is sufficiently high to maintain the charge on condenser 31 substantially constant until it is purposely removed.

In order to remove the lengthened pulse from the circuit 3 as soon as interrogation of the discriminator channels 4 has been completed, a special circuit is provided. Triode 37 has its control grid coupled to the cathode of tube 36 and is so biased that it will conduct whenever the lengthened pulse is stored in condenser 31, causing tube 36 to conduct. When the pulse is being removed from condenser 31, conduction through tube 37 will decrease, raising the plate potential, which will raise the control grid of tube 38 above cut off. The anode of tube 38 is coupled to the positive terminal of condenser 31, so that the tube provides a low impedance discharge path for the condenser and enables rapid removal of the charge therefrom.

To prevent the undershoot that would normally occur when the lengthened pulse is removed from condenser 31 as a result of the undershoot of the grid of tube 36, a circuit comprising condenser 39 and diode 40 is provided. Condenser 39 is normally charged to the potential existing between the cathode of tube 37 and the control grid of tube 38. Should this potential attempt to become smaller than the normal value because of an attempted undershoot at the end of a pulse, diode 40 will conduct, lowering the potential on the control grid of tube 38, thus decreasing the plate current of tube 38 and thus preventing the undershoot.

Referring now to Figure 3, the negative control pulse from the amplifier 1 is coupled to input terminal 410. Delay line 420 is provided in the plate circuit of tube 43, and serves to provide a positive, delayed square-wave output which is coupled to the suppressor grid of tube 44 through condenser 46 and resistor 47. The cathodes of tubes 43, 48 are coupled together, the control grid of tube 43 is coupled to a source of +160 volts, and the control grid of tube 48 is maintained at +140 volts, so that tube 48 is normally cut off and tube 43 normally conducts. When the incident control pulse cuts off tube 43, its cathode potential falls sufficiently so that tube 48 will begin to conduct, thus producing a negative pulse at the plate of tube 48. That pulse is coupled to the control grid of tube 44 through condenser 49 and diodes 50, 51, which form a coupling network and lengthen the pulse so as to keep the grid of tube 44 below cut off until very near the end of the delay period, which has been chosen as 2.3 μ sec. When the positive, delayed pulse arrives at the suppressor grid, tube 44 will begin to conduct. But should a second control pulse arrive at input 410 during the 2.3 μ sec. interval, the single negative pulse produced by tube 48 will be followed by a second pulse, which will drive the control grid of tube 44 more negative. The second pulse is in effect lengthened by the diode coupling network, and maintains the potential of the control grid of tube 44 below cut off, thereby preventing the positive pulse from the delay line 420 from rendering tube 44 conductive.

When tube 44 is caused to conduct briefly by the positive, delayed pulse, a negative pulse is produced in its plate circuit and coupled to switching circuit 6. A diode coincidence circuit including diodes 51', 52, 53 determines whether or not that pulse will be passed to the output 54. If switch arm 55 is thrown to contact terminal 56 current will flow from the source through lead 57 and relay coil 58, closing normally open contact 59, which shorts out resistor 60 and raises the plate potential of diode 52 preventing the pulse from diode 51 from passing. "Gate signal" switch arms 61, 61' must be thrown to contact terminals 62, 62'. The potential on the control grid of tube 63 is determined by the potential impressed on arm 61'. Terminal 62' is supplied from a source of −6.5 volts, so that tube 63 will be cut off, no current will flow through resistor 64, and the plate of diode 53 will be held up, preventing the pulse from diode 51 from passing to the output. Were arms 61, 61' thrown to contact terminals 65, 65', arm 61' would be connected to a source of +270 volts through resistor 66, tube 63 would conduct heavily, and the plate potential of diode 53 would fall, so that any negative pulse could pass to output 54 without interference.

The negative signal from output 54 is applied to a univibrator circuit including cathode-coupled tubes 67, 68, which circuit provides a negative pulse on lead 69 to cut off tube 42 and also a positive pulse on lead 70. When tube 41 cuts off, charge deposited on condenser 31 will remain there and lengthener circuit 3 is able to function, or enabled. The positive pulse is inverted and shaped by tube 71 and its associated network and again inverted and delayed for 1.7 μ sec. by tube 72 and delay line 73 in the tube's plate circuit. The delayed pulse is coupled to the control grid of tube 75, which produces the "interrogator" pulse on lead 76 for inspecting the discriminator channels. The shorted delay line 74 removes the input pulse to tube 75 after about .4 μ sec. The resulting negative pulse at the plate of tube 75 is coupled through lead 77 to the control grid circuit of tube 78, where it is differentiated, the positive spike from the trailing edge of the pulse causing the tube to conduct. The negative pulse at the plate of tube 78 will reset the univibrator to its original position through coupling condenser 79, thus restoring the pair of current tubes 41, 42 to their normal states and resetting pulse lengthener 3 to its disabled state.

Referring now to Figure 5, three discriminator channels of the twenty-one identical channels we have provided are illustrated in detail. Each channel comprises a conventional trigger circuit feeding a scaler driver tube. The lowest ordered discriminator channel 101 has its trigger circuit biased to trigger on receipt of a pulse of 3 volts. Each successively higher ordered channel is biased 3 volts more negative than the next lower ordered channel, in the conventional manner, through a diode coupled to the input grid of the trigger circuit. When a pulse is delivered to discriminators 4 on lead 99, all channels biased by a voltage less than the amplitude of the received pulse will be triggered, the trigger circuits producing a positive pulse and a negative pulse. In channel 121, for example, the positive pulse is produced on lead 122 with the negative pulse on lead 123. The negative pulse in each channel is coupled through a diode to the positive pulse output of the next lowest ordered channel to cancel it by anti-coincidence action. For example, diode 124 couples channels 120 and 121. Therefore, only the highest order channel that is triggered will deliver a positive pulse output to its associated scaler driver tube. The "interrogator" pulse from lead 76 is applied to the cathodes of all scaler driver tubes simultaneously. The latter tubes are so biased that they will not conduct unless they receive both a positive trigger pulse on their control grids and a negative "interrogator" pulse on their cathodes at the same time. When a tube conducts momentarily, it produces a negative pulse in its plate circuit. Such pulses are coupled to corresponding scalers through output terminals 201—220, 221.

A separate driver tube 125 is coupled to the trigger circuit in the lowest ordered channel 101 to receive a pulse for each count received on lead 99 coincident with the "interrogator" pulse on lead 76. This driver actuates a scaler through output 225 so that the scaler provides an indication of the total count received.

The pulse counters provided may be scaling circuits of conventional design with associated mechanical counters, the Higginbotham-type circuit being preferred. A separate scaler is coupled to the output of each driver tube to record the number of pulses producing an output from the scaler driver of each channel.

In a preferred embodiment of our analyzer we have utilized the following vacuum tubes and crystals, listed according to their identifying reference numerals: 21— 12AT7; 23, 24—404A; 25—½ 5687; 26—6AL5; 27— 5651; 28, 29, 33—1N38—A; 36—12AT7; 37—½ 5687; 38—6AH6; 40—1N38—A; 43, 48—6AK5; 44—6AS6; 50, 51, 52, 53—1N34A; 63—6AK5; 67, 68, 41, 42, 78— 6AH6; 71—6AK5; 72, 75—6AG7; 31—150, 151—12AT7; 160, 161—180, 181—½ 12AT7. Unnumbered diodes shown are preferably type 1N34A. Storage condenser 31 may preferably be $10^{-11}$ farads in capacitance. Delay line 8 is selected to provide a pulse delay of 2.4 $\mu$ secs., line 420 provides 2.3 $\mu$ secs. delay, line 73 provides 1.8 $\mu$ secs. delay, and line 74 is a short-circuited .2 $\mu$ sec. line. It will be apparent that those skilled in the art may provide other selected component values and utilize other types of tubes without departing from the spirit of our invention, as defined in the following claims.

Having thus described our invention, we claim:

1. A multi-channel analyzer for determining pulse amplitude distribution comprising a linear amplifier for providing a signal pulse with amplitude proportional to the amplitude of each corresponding input pulse and a control pulse corresponding to each input pulse, means for delaying said signal pulse, an amplitude-selective amplifier for selecting delayed pulses within a selected voltage amplitude range, a pulse lengthener coupled to said amplifier for sustaining the crest of incident pulses, a plurality of parallel-connected discriminators coupled to said pulse lengthener and biased to operate at different potentials, means for counting output pulses from each of said discriminators, circuit means for delaying each control pulse for a selected time interval, means for rejecting said delayed control pulse upon receipt of a second control pulse within said interval, means for enabling said lengthener responsive to passage of said delayed control pulse, and means for enabling said discriminators simultaneously responsive to passage of said pulse.

2. A multi-channel analyzer for determining pulse amplitude distribution comprising a linear amplifier for providing a signal pulse with amplitude proportional to the amplitude of each corresponding input pulse and a control pulse corresponding to each input pulse, means for delaying said signal pulse, an amplitude-selective amplifier for selecting delayed pulses within a selected voltage amplitude range, a pulse lengthener coupled to said amplifier for sustaining the crest of incident pulses, a plurality of parallel-connected discriminators coupled to said pulse lengthener and successively biased to operate at progressively higher potentials, each comprising a trigger circuit adapted to produce positive and negative output pulses when triggered, a driver stage coupled to receive said positive pulses, and means for coupling said negative pulses to the adjacent lower biased discriminator driver stage to cancel the effect of a corresponding positive pulse, means for counting output pulses from each of said discriminators, circuit means for delaying each control pulse for a selected time interval, means for rejecting said delayed control pulse upon receipt of a second control pulse within said interval, means for enabling said lengthener responsive to passage of said delayed control pulse, and means for enabling said discriminators simultaneously responsive to passage of said pulse.

3. A multi-channel analyzer for determining pulse amplitude distribution comprising a linear amplifier for providing a signal pulse with amplitude proportional to the amplitude of each corresponding input pulse and a control pulse corresponding to each input pulse, means for delaying said signal pulse, an amplitude-selective amplifier for selecting delayed pulses within a selected voltage amplitude range, a pulse lengthener coupled to said amplifier for sustaining the crest of incident pulses, a plurality of parallel-connected discriminators coupled to said pulse lengthener and successively biased to operate at progressively higher potentials, each comprising a trigger circuit adapted to produce positive and negative output pulses when triggered, a driver stage coupled to receive said positive pulses, and means for coupling said negative pulses to the adjacent lower biased discriminator driver stage to cancel the effect of a corresponding positive pulse, means for counting output pulses from each of said discriminators, circuit means for delaying each control pulse for a selected time interval, means for rejecting said delayed control pulse upon receipt of a second control pulse within said interval, means for enabling said lengthener responsive to passage of said delayed control pulse, and circuit means including an interrogator stage actuated responsive to passage of said delayed control pulse and coupled to each of said driver stages, said driver stages being biased to produce an output signal only upon coincidence of a signal from said interrogator stage and said positive signal from said driver stage.

4. A multi-channel analyzer for determining pulse amplitude distribution comprising a linear amplifier for providing a signal pulse with amplitude proportional to the amplitude of each corresponding input pulse and a control pulse corresponding to each input pulse, means for delaying said signal pulse, an amplitude-selective amplifier for selecting delayed pulses within a selected voltage amplitude range, a pulse lengthener coupled to said amplifier for sustaining the crest of incident pulses, a plurality of parallel-connected discriminators coupled to said pulse lengthener and biased to operate at different potentials, means for counting output pulses from each of said discriminators, an inspector circuit for receiving said control pulses and delivering an output pulse after a preselected time interval if no further control pulse is received, comprising an output device, a binary electronic current switch having two possible current paths, and provided with an input for receiving said control pulse, the magnitude of said control pulse being such that said switch is actuated by receipt thereof to produce a positive and a negative pulse, means in one of said paths for delaying said positive pulses by said time interval, respective networks coupling said pulses to said output device, said device being arranged to produce an output signal responsive to said positive pulse but adapted to be disabled by receipt of two negative pulses on the respective coupling network within said time interval.

5. In apparatus of the character described, a pulse lengthener circuit coupled to an amplifier to receive pulses therefrom and comprising a first electron tube provided with a cathode, plate, and control grid, a first condenser coupled to said grid, first and second series-connected rectifiers coupling said grid with the output of said amplifier, a source of bias voltage, a third rectifier shunted by a first resistor and coupled between the junction of said first and second rectifiers and said source, a second condenser coupling said cathode to said third rectifier, and means for supplying operating current to said rectifiers, said means comprising a cathode-coupled pair of electron tubes, each tube having a cathode, control grid, and plate, the plate of one tube being coupled to said first rectifier and the plate of the other tube being coupled to said first condenser.

6. In apparatus of the character described, a pulse lengthener circuit for sustaining the crest of pulses received from an amplifier comprising a first electron tube, provided with a cathode, plate, and control grid, a first condenser coupled to said grid, means for charging said condenser by each pulse received, thereby varying conduction through said tube, second and third electron tubes provided with respective cathode, plate, and control grid electrodes, said second tube grid being coupled to said cathode of said first tube to monitor conduction through said first tube, said second tube plate being coupled to said grid of said third tube to control the conduction thereof and said third tube plate being coupled to said first condenser to furnish a low impedance discharge path therefor, and means for preventing pulse undershoot comprising a second condenser and a rectifier connected in series between the cathode of said second tube and the grid of said third tube for lowering the potential at said last-named grid responsive to attempted overshoot at the grid of said first tube.

7. In a pulse analyzer for sorting electrical impulses according to magnitude into one of a plurality of channels, a linear amplifier for receiving pulses to be sorted and providing a first pulse proportional in magnitude to the magnitude of the received signal and a second pulse for each of said received pulses; means for amplifying said first pulses; a pulse lengthener circuit coupled to said amplifying means; a plurality of discriminator channels coupled to said lengthener circuit; inspection circuit means coupled to receive said second pulses and to produce an output signal responsive thereto; means in said inspection circuit for disabling said output responsive to receipt of two pulses within a predetermined time interval; switch means responsive to said output signal for enabling said lengthener circuit; circuit means responsive to said switch means for producing an interrogation pulse; and means coupling said interrogation pulse to said discriminator channels, for inspection thereof coincident with arrival of a pulse to be analyzed from said lengthener circuit, and to said switch means for resetting the same.

References Cited in the file of this patent

UNITED STATES PATENTS

| | | |
|---|---|---|
| 2,236,134 | Gloess | Mar. 25, 1941 |
| 2,536,032 | Clark | Jan. 2, 1951 |
| 2,648,725 | Wright | Aug. 11, 1953 |